Patented July 4, 1950

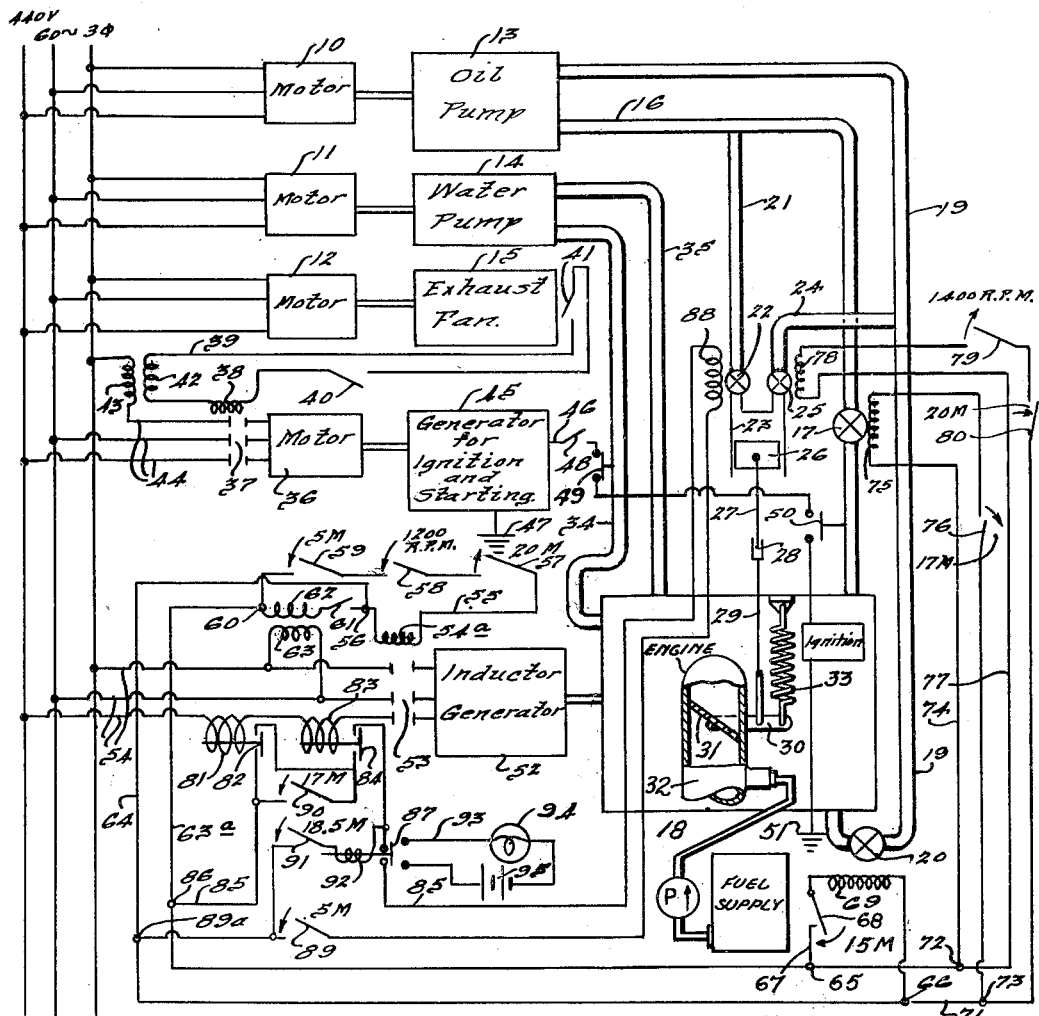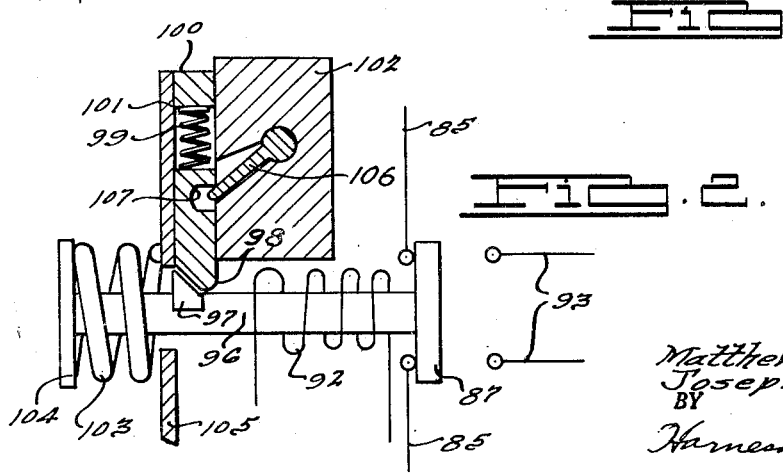

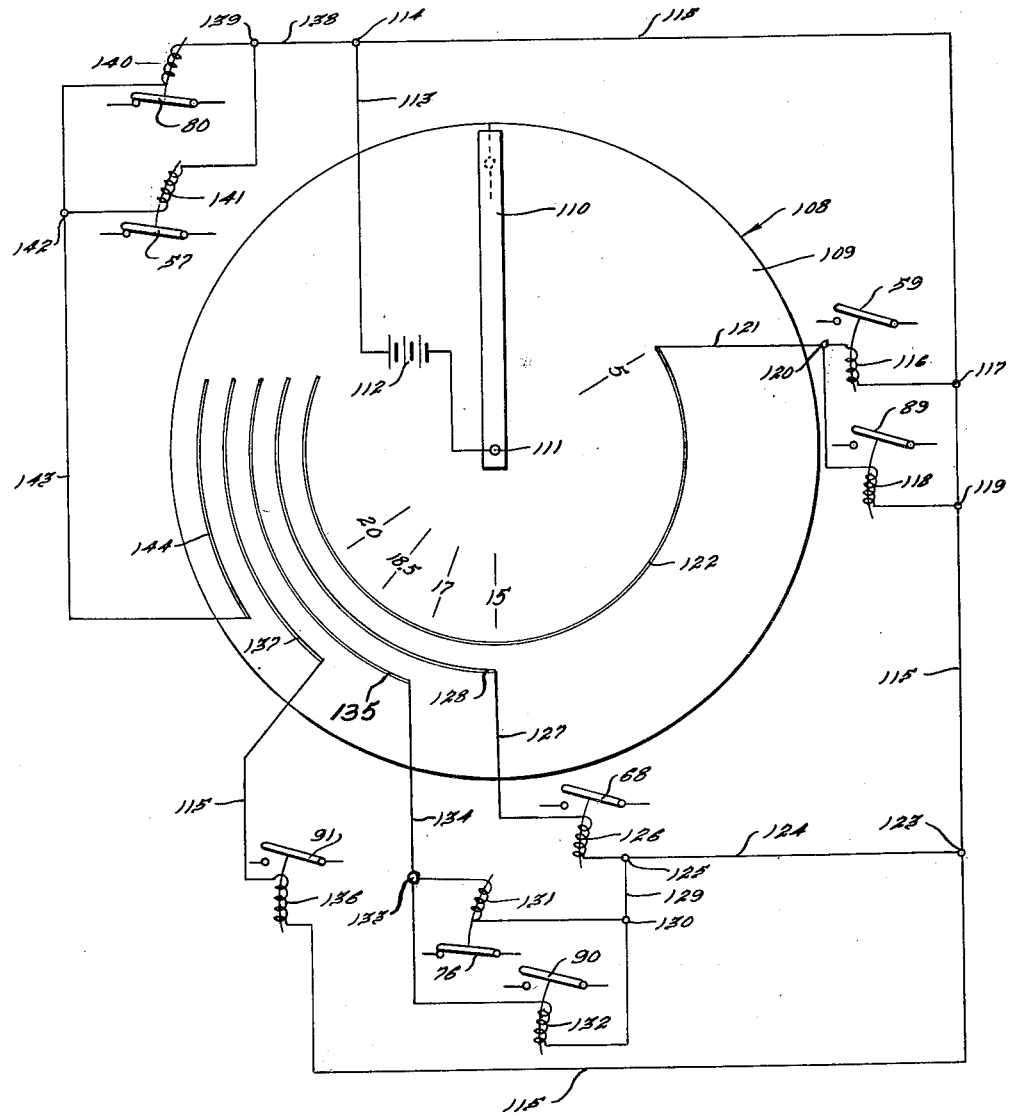

2,513,816

UNITED STATES PATENT OFFICE 2,513,816

ENGINE TESTING APPARATUS

Matthew C. Patterson, Grosse Pointe Park, and Joseph A. Baker, Roseville, Mich., assignors to Chrysler Corporation, Highland Park, Mich., a corporation of Delaware Application August 24, 1945, Serial No. 612,478

13 Claims. (Cl. 73—116)

This invention relates to a method and apparatus for testing engines. More specifically it relates to testing an engine under various load conditions with the various steps of the test carried out automatically. Provision is made for failure of the engine to pass its test to prevent the testing of another engine unless an appropriate person in charge of the test is notified.

An object of the present invention is to provide an improved method and apparatus for testing an engine under various conditions of load. The apparatus may include appropriate devices for carrying out parts of the test automatically and for automatically regulating times of the various parts of the test.

A further object relates to the provision in an apparatus for testing an engine by appropriate means for preventing the test of a second engine without appropriate notification in the event of failure of a first engine to pass its test under all those conditions. The apparatus may be so regulated that failure of the first engine to pass its test will set the apparatus in such a way that only an appropriate control means such as a key under the control of an authorized person can reset the engine for making possible the testing of a second engine.

Other objects will appear from the disclosure.

In the drawings:

Fig. 1 constitutes a diagrammatic showing of an engine, the novel apparatus of the present invention for testing the same, and various associated parts;

Fig. 2 is a detail view, partly in section of a key-controlled switch constituting a part of the present invention; and Fig. 3 is a view showing a timer for operating various switches.

The reference characters 10, 11, and 12 designate motors driving, respectively, oil pump 13, water pump 14, and exhaust fan 15. The motors 10, 11, and 12 are connected in parallel with one another and to a 440 volt, 60 cycle, three-phase power line. A feed line 16 leads from the oil pump 13 through a valve 17 to an engine 18. A drain line 19 leads from the engine 18 through a valve 20 back to the pump 13. A branch line 21 leads from the feed line 16 through a valve 22 to a hydraulic cylinder 23. A branch line 24 leads through a valve 25 to the drain line 19. A piston 26 is slidably mounted in the hydraulic cylinder 23. A rod 27 is connected at one end to the piston 26 and is slidably received at the other end in a sleeve 28 fixed to one end of a rod 29. The other end of the rod 29 is connected to an arm 30 fixed to a throttle valve 31 pivotally positioned in an intake manifold 32 for the engine 18. A spring 33 connected at one end to a fixed portion of the engine 18 and at the other end to the free end of arm 30 tends to hold the throttle valve 31 in the closed or idle position, as shown. A feed line 34 leads from the water pump 14 to the engine 18, and a drain line 35 leads from the engine to the water pump.

A motor 36 is adapted to be connected through a switch 37 with the three-phase power line. The switch 37 is adapted to be closed by the action of current flowing in a control represented diagrammatically as a coil 38 forming part of a circuit 39, which also includes a manually operated switch 40 and a switch 41 adapted to be closed through a speed responsive element, not shown, operating from the exhaust fan 15. Also included in the circuit 39 is a secondary coil 42 of a transformer, which also has a primary coil 43 in one of three lines 44 leading from the switch 37 to the three-phase power line. The motor 36 drives a generator 45, which is adapted to start the engine 18 and to supply the ignition current thereto. The ignition current is supplied through a circuit 46, which includes the ground 47, a manually operated switch 48, a switch 49 closable in response to a predetermined pressure in the water feed line 34, a switch 50 closable in response to a predetermined pressure in the oil feed line 16, and a ground 51.

The engine 18 is drivingly connected with an inductor generator 52, which is adapted to be connected through a switch 53 and three lines 54 with the three-phase power line. The switch 53 is adapted to be closed by a control 54ᵃ diagrammatically represented as a coil. The coil 54ᵃ is in a line 55 extending from a junction point 56 through switches 57, 58, and 59 to a junction point 60. Between the junction points 56 and 60 is a line in which are positioned a manually controlled switch 61 and the secondary coil 62 of a transformer, the primary coil 63 of which is connected across two of the lines 54. The 440 volts supplied to the primary coil 63 by the three-phase power line are reduced to 110 volts in the secondary coil 62. The switches 57 and 59 are designated respectively with the additional characters "20M" and "5M." These expressions mean respectively that the switches are shifted by means of a time relay twenty minutes after the starting point and five minutes after the starting point. An arrow is applied to the switch 57 to show a movement toward an open position of the switch, and this means that the switch is opened twenty minutes after the starting point. An arrow applied to the switch 59 indicates a movement toward a closed position of the switch and thereby indicates that the switch 59 is closed five minutes from the starting point. Various other switches to be described presently carry in addition to the regular reference characters viewed from the specification, a number followed by the letter "M" and also an arrow indicating movement toward the closed position of the switch or the open position thereof. Each supplementary reference accompanied by the letter "M" indicates that the switch is controlled by the time relay and is adapted to be closed or opened a certain number of minutes after the starting point. The direction of the arrow indicates whether the switch is to be closed or opened. The switch 58 carries the additional designation of "1200 R. P. M." and an arrow pointing to closed position of the switch. This means that the switch is closed when the engine reaches the speed of 1200 R. P. M.

Lines 63a and 64 lead respectively from junction points 60 and 56 to junction points 65 and 66. A line 67 leads from the junction point 65 through a switch 68 adapted, as indicated, to be closed fifteen minutes after the starting point and through a solenoid 69 to the junction point 66, the solenoid controlling the drain valve 20 and the oil drain line 19. Line 71 leads from junction 66 to junction 73. Continuation of line 63a leads from junction 65 to junction 72. A line 74 leads from the junction point 72 through a solenoid 75 controlling the oil feed valve 17 in the feed line 16 and through a switch 76 to the junction point 73. As indicated, the switch 76 is adapted to be opened seventeen minutes after the starting point. A line 77 leads from the junction point 72 through a solenoid 78, and switches 79 and 80 to the junction point 73. The solenoid 78 controls the valve 25 in the line 24 leading from the hydraulic cylinder 23 to the drain line 19. The switch 79 is adapted, as indicated, to be oened when the engine reaches a speed of 1400 R. P. M. As indicated, the switch 80 is adapted to be opened twenty minutes after the starting point.

In one line 54 is connected a solenoid 81 adapted to operate at a current in the line 54 representing half load upon the engine 18 to open the switch 82. Also connected in the line 54 is a solenoid 83 adapted to operate by a current in the line 54 representing full load upon the engine 18 to open a switch 84. The switches 82 and 84 are connected in a line 85 leading from the junction point 86 on the line 63a through the switches 82 and 84, a switch 87, the solenoid 88 controlling the valve 22, and a switch 89 closable five minutes after the starting point, as indicated, back to a junction point 89a on the line 64. Connected in parallel with the switch 82 is a switch 90 closable seventeen minutes after the starting point. And connected in parallel with the circuit portion including switches 87 and 89 are a switch 91 closable eighteen and one-half minutes after the starting point and a solenoid 92 controlling the switch 87. The solenoid 92 is adapted to move the switch 87 from the position shown in Fig. 2, in which it contacts the line 85 to a position in which it closes a circuit 93 which includes a rejection lamp 94 and an electric power source such as a battery 95.

The apparatus and equipment just described are adapted to be used for testing the engine or motor 18. The procedure for operating in conducting the test is as follows.

First, the motors 10, 11, and 12 are started in order to start the oil pump 13, the water pump 14, and the exhaust fan 15. These may be part of a central system that supplies oil, water, and air to a plurality of engines being tested, but only one engine 18 to be tested is shown. Then the manual switch 40 is closed, and when the exhaust fan 15 has reached a sufficient speed, the speed responsive switch 41 closes causing current to flow in the coil 38, which closes the switch 37 connecting the motor 36 through the lines 44 to the three-phase power supply. The motor 36 starts the generator 45. Thereafter the engine 18 is placed on the test stand, connections are made for ignition, starting, gas, oil supply, oil drain, water and exhaust, and the engine is coupled to the inductor generator 52. Then the test may be made for engine timing by suitable means, not shown. Thereupon the manual switch 48 is closed for engine ignition. Suitable means, not shown, may be provided for interconnecting the manual switch 48 with the manual switch 61 for closing these two switches simultaneously. Closing of the switch 61 causes current to flow through the solenoid 75 thereby opening the valve 17 in the oil feed line 16 permitting oil to pass through the engine and out through the drain line 19 through open valve 20 in the drain line. When the oil and water pressures in the feed lines 16 and 34 have reached predetermined values, the switches 50 and 49 close causing current to be supplied from the generator 45 to the ignition system of the engine, and the engine is thereby started. Thereupon the throttle valve 31 is connected to the hydraulic piston 26 by attachment of the rod 29 to the arm 30. An appropriate stop against which the throttle valve 31 is to be returned to idle position by the spring 33 is adjusted for a desired idling speed of the engine, for example, 500 R. P. M. Thereupon a time relay device, one appropriate form of which is hereinafter described, may be set in motion. Such procedure may involve, for example, starting an appropriate motor. The setting in motion or the starting of the time relay apparatus marks the starting point previously referred to. This starting time is the zero time for all time-responsive switches.

Five minutes after the starting point the switch 89 closes as indicated, and current flows through the solenoid 88, thereby causing the valve 22 to open. This action causes oil to be fed from the feed line 16 through the branch line 21 into the hydraulic cylinder 23. The valve 25 is normally closed at this point since the switches 79 and 80 are closed and consequently, current flows through the solenoid 78 to hold the valve 25 closed. Thus the piston 26 is moved in a downward direction as viewed in Fig. 1 and acts through the rods 27 and 29 to increase the opening of the throttle valve 31. In the meantime, the switch 59 will also have closed, i. e., after the elapse of five minutes from the starting point. When the increase in the opening of the throttle valve 31 is sufficient to cause the engine speed to reach 1200 R. P. M. the switch 58 closes. This switch may be appropriately controlled by electronic means, not shown, operating from the ignition system of the engine. Closing of the switches 58 and 59 causes current to flow in the control coil 54a, thereby closing the switch 53 connecting the inductor generator 52 through the lines 54 to the three-phase power line. Thus a load is applied by the inductor generator to the engine, and when one-half rated load is reached as represented by a certain current flowing from the inductor generator through the lines 54 of the three-phase power line, the solenoid 81 opens the switch 82. Opening of the switch 82 interrupts flow of current through the solenoid 88 thereby closing the valve 22 and holding the piston 26 and the throttle valve 31 against movement. The arrival at one-half load may be appropriately indicated on a control board by means, not shown, connected for example, with the switch 82 so that a check may be made as to proper performance during the one-half load period. The switch 79 acts to prevent racing of the engine in the event that the inductor generator 52 is not connected with the lines 54 or that there is a failure of power in the three-phase power line. In the aforesaid events the engine will go to an overspeed of 1400 R. P. M. at which point the switch 79 will open causing interruption of current to the solenoid 78 and thereby opening the valve 25 exhausting oil from the cylinder 23 to the line 24 to the drain line 19. This permits the throttle valve 31 to return to idle position under the action of the spring 33. The switch 79 may be under control of electronic means, not shown, operated by the ignition system of the engine.

Fifteen minutes after the starting point or in other words, ten minutes after the period leading to one-half load was started, the switch 68 closes as indicated thereby causing current to flow through the solenoid 69 and closing the oil drain valve 20. Now the level of the oil in the engine 18 rises. Two minutes thereafter or seventeen minutes after the starting point the switch 76 opens, as indicated, causing the current to stop flowing through the solenoid 75 and causing the valve 17 to close. This stops the supplying of oil to the engine by the external oil pump 13 and the engine now operates upon its own oil pump.

At the same time, i. e., seventeen minutes after the starting point, the switch 90 connected in parallel with the now open switch 82, closes and current again flows through the solenoid 88 causing the valve 22 to open and oil to be admitted from the feed line 16 to the branch line 21 to the cylinder 23. Thus the piston 26 moves downward in the cylinder as shown and acts through the rods 27 and 29 to increase the opening of the throttle valve 31. Speed of the engine is increased, and the inductor generator 52 feeds more current through the lines 54 into the three-phase power lines. When the current in the lines 54 corresponding to full rated load of the engine is reached, the solenoid 83 causes the switch 84 to open. This action interrupts flow of current through the solenoid 88 causing the valve 22 to close. The piston 26 is held against movement in the cylinder 23 and similarly the opening of the throttle valve 31 is fixed. The arrival of the engine at full load may appropriately be indicated through a light on the control board, not indicated, operated for example, by opening of the switch 84. At this time the engine may be checked for proper performance during the full load period.

At twenty minutes after the starting point or in other words, three minutes after the period for full load was started, the switch 80 is opened as indicated, causing interruption of current flow in the solenoid 78 and opening of the valve 25. This permits the oil to drain from the cylinder 23 through the line 24 to the oil drain line 19 and the throttle valve to return to idle position under the action of the spring 33. At this same time, i. e., twenty minutes after the starting period, the switch 57 opens interrupting flow of current through the control coil 54ª. This causes the switch 53 to open and the load of the three-phase power line to be removed from the inductor generator 52. Thus the load is removed from the engine 18.

In the event that the engine fails to pull its full load during the three-minute period seventeen to twenty minutes after the starting point the switch 84 will remain closed. At the half-way point in this three-minute period, i. e., eighteen and one-half minutes after the starting point, the switch 91 closes, as indicated, causing the solenoid 92 to shift the switch 87 to the right from the position indicated, causing the line 85 to be broken and the circuit 93 containing the rejection lamp 94 to be closed. Lighting of the rejection lamp 94 indicates that the engine has failed to pull full load; the switch 87 can be returned to the position shown only by means of a key supposedly used only by an authorized person such as an inspector or a foreman, to whose attention the failure of the engine must come, as will later be described with reference to Fig. 2. Otherwise the rejection lamp 94 will stay lit and the circuit containing the solenoid 88 controlling opening of the valve 22 for feeding oil to the cylinder 23 for increasing the opening of the throttle valve 31 may not be closed. Thus unless the failure of the engine to pull full load is called to the attention of an authorized person having the key permitting release of the switch 87 to the position shown, another engine cannot be put through the above described test.

When the test of the engine is over, the engine is appropriately disconnected from various parts of the testing apparatus and is removed from the stand.

Fig. 2 shows an embodiment of an apparatus by which the switch 87 may be controlled. The switch 87 has a stem 96 about which the solenoid 92 is coiled. An inclined projection 97 fixed to the stem 96 is engaged as shown by an inclined face of a dog 98. A spring 99 acting between the dog 98 and a piece 100 urges the dog into the position of Fig. 2. The dog 98 is slidably mounted between a plate 101 and a block 102. The switch 87 and its stem 92 are urged to the left and maintained in the position of Fig. 2 by a coil spring 103 acting between a collar 104 fixed to the end of the stem 96, the plate 101, and a part 105. When current passes through the solenoid 92, because the switches 84 and 91 are closed, the switch 87 and its stem 96 are urged to the right from the position of Fig. 2 to a position in which the switch no longer closes the line 85, but closes the circuit 93 of the rejection lamp 94. The stem 96 may move to the right, for the inclined faces on the projection 97 and the dog 98 cause the dog 98 to be moved upwardly against the spring 99. The projection 97 thus moves past the dog 98 to the right, and the dog returns to the stem 96. Now there is contact between the right side of the dog 98 and the left side of the projection 97, preventing the stem 96 and switch 87 from returning to the left and thus keeping the circuit 93 closed and the rejection light 94. Also the line 85 is kept open and thus current cannot flow through the solenoid 88 for opening the valve 22 for opening the throttle valve 31 by oil control. Thus another engine cannot be tested. An authorized person may insert a key 106 in an opening in the block 102.

The key engages a recess 107 in the dog 98 and by a clockwise movement will raise the dog 98 out of the way of the projection 97 to permit the return of the stem 96 and the switch 87 to the left under the action of the spring 103. This causes the rejection lamp 94 to be extinguished and the line 85 to be closed.

Fig. 3 shows a timer 108 for the various time-responsive switches. The timer comprises a dial 109 and rotating hand or arm 110, mounted on a pivot 111, and suitably driven by a time mechanism, not shown. The arm 110 is connected through its pivot 111 with a suitable source of electric power such as a battery 112. The battery 112 is connected through a line 113 with a junction point 114, from which leads a line 115. A solenoid 116, operating the switch 59 is connected to the line 115 at a junction point 117 thereon. A solenoid 118, operating the switch 89, is connected with the line 115 through a junction point 119 therein. The two solenoids 116 and 118 are connected at a junction point 120 with a line 121, which is connected with a conductor 122 in the timer 108. From a junction point 123 in the line 115 leads a line 124 to a junction point 125 to which is connected a solenoid 126, which operates the switch 68. A line 127 leads from the solenoid 126 to a conductor 128 in the timer 108. From the junction point 125 leads the line 129 to a junction point 130, to which is connected a solenoid 131, operating the switch 76. A solenoid 132, which operates the switch 90, is connected to the junction point 130. The solenoids 131 and 132 are connected to a junction point 133 from which leads a line 134 to a conductor 135 in the timer 108. In the line 115 is connected a solenoid 136 operating the switch 91, and the line 115 connects the solenoid 136 with a conductor 137 in the timer 108. From the junction point 114 leads a line 138 to a junction point 139, to which are connected in parallel solenoids 140 and 141, which operate, respectively, switch 80 and switch 57. The solenoids 140 and 141 are connected at a junction point 142 from which leads a line 143 to a conductor 144 in the timer 108. In Fig. 3 switches 59, 68, 89, 90, and 91 are shown to be open, and when current is supplied to their respective solenoids these switches will be closed. Switches 57, 76, and 80 are shown to be closed, and when current is supplied to their respective solenoids, they will be opened. At the start of the test of the engine as previously described in the specification, the timer arm 110 is at the zero point as shown in Fig. 3. When five minutes from the starting point of the test have elapsed, the arm 110 will contact the conductor 122, the end of which carries a designation "5." Upon contact of the arm 110 with the conductor 122, a circuit is closed from the battery 112 through the arm 110, the solenoids 116 and 118, and the conductors 115 and 113. The energization of the solenoids 116 and 118 causes the switches 59 and 89 to close. As time elapses after the five-minute point, the arm 110 stays in contact with the conductor 122, and the switches 59 and 89 continue shut. When 15 minutes have elapsed from the start of the test, the arm 110 will contact the conductor 128, closing a circuit through the solenoid 126, which closes the switch 68. The arm 110 stays in contact with the conductor after the 15-minute point to maintain the switch 68 closed. When 17 minutes have elapsed from the starting point of the test, the arm 110 reaches the conductor 135, thereby closing a circuit through the solenoids 131 and 132, causing them, respectively, to open the switch 76 and to close the switch 90. Thereafter the arm 110 stays in contact with the conductor 135, causing the switch 76 to be kept open and the switch 90 to be kept closed. When 18½ minutes have elapsed from the starting point of the test the arm 110 reaches the conductor 137 causing a circuit to be formed through the solenoid 136, which closes the switch 91. Continuance of the contact of the arm 110 with the conductor 137 keeps the switch 91 closed. When 20 minutes have elapsed from the start of the test, the arm 110 contacts the conductor 144, causing current to flow through the solenoids 140 and 141, which now open the switches 57 and 80. The conductors 122, 128, 135, 137, and 144 may extend beyond the 20-minute point so far as is convenient for maintaining the time-responsive switches in their relative positions at the 20-minute point.

In some cases the engine may be so constructed or modified by auxiliary devices such as special jets for the carburetor that it will pull a greater load than that represented by the current in the one line 54 that will open the switch 84 by means of the solenoid 83. In this event the throttle valve 31 may be opened by hand further than the piston 26 would open it, the sliding connection of the rod 27 in the sleeve 28 attached to the rod 29 permitting movement of the rod 29 independent of the rod 27.

Although various engine speeds and times have been indicated for operating switches described in regard to the present invention, it is to be understood that the values supplied are merely illustrative and are not to be considered as limiting the invention beyond the scope and spirit of the appended claims.

We claim:

1. An apparatus for testing an engine having a throttle valve, comprising hydraulic means for adjusting the throttle valve to obtain settings of the throttle valve for no load, half load, and full load, electric means for controlling the hydraulic means so as to establish periods of time for running the engine at the various loads, the electric means including a switch adapted to be opened to prevent adjustment of the hydraulic means for preventing adjustment of the throttle valve by said hydraulic means and being closable only with a key, and means responsive to failure of the engine to pull full load during the full load period, for opening the switch.

2. Testing apparatus for an engine provided with positionable means for admitting fuel having positions corresponding to predetermined values of power output desired of the engine: comprising electrical operating means adapted for connection with the positionable fuel admitting means, an electrical generator adapted to be connected to load and to be driven by the engine, time responsive control elements for causing the electrical operating means to change the position of the fuel admitting means at certain times, and means responsive to power output of the generator for interrupting the changing of the fuel admitting means position by the electrical operating means upon attainment of a predetermined power output from said electrical generator.

3. Apparatus for utilizing a power generator and a load for receiving power therefrom to test a power plant which includes a prime mover drivingly connectable to said generator and a regulatable fuel admitting means; comprising means for regulating the fuel admitting means, time-responsive elements for causing the regulating means at certain times to advance regulation of the fuel admitting means for an increased fuel rate from no load and part load and to retard regulation of the fuel admitting means for a decreased fuel rate from full load to no load, means responsive to engine speed for connecting the power generator to the load so as to load the prime mover, and means responsive to power output of the generator to the load for causing the regulating means to fix the regulation of the fuel admitting means for part load of the prime mover and for full load of the prime mover.

4. Apparatus for testing an engine having a throttle valve, comprising hydraulic means for controlling the opening of the throttle valve including a cylinder for pressure fluid and a piston slidably mounted in the cylinder and connected to the throttle valve, electrical means associated with the hydraulic means for causing the same to control the throttle valve as aforesaid, means for supplying electrical current to the electrical means and interrupting the supplying thereof including switches openable and closable at certain times and under certain loads for acting through the electrical means and the hydraulic means to regulate the throttle valve for running the engine for predetermined times at no load, half load, and full load, and further including a switch openable in response to failure of the engine to pull full load during the time period for full load to interrupt the flow of current to the electrical device and closable only with a key.

5. An apparatus for testing an engine, comprising means for admitting fuel to the engine, control means responsive to time and to the operation of the engine under various conditions such as no load, half load, and full load for acting through the fuel-admitting means to operate the engine for certain times from no load to full load and back to no load, means responsive to failure of the engine to operate at full load during the time period for full load to set the control means against the aforesaid action on the fuel-admitting means for preventing the testing of another engine, and key-controlled means for resetting the control means to provide for the aforesaid action by the control means on the fuel-admitting means.

6. Apparatus for utilizing an electrical power load to test a prime mover provided with a throttle control having a normal range of motion between idling and full power positions: comprising automatic means adapted for operative connection with the throttle control to be effective for automatically advancing the throttle for at least a part of its normal range of motion, electrical energy generating means connectable to the electrical power load for loading said generating means, said electrical energy generating means being adapted for drive receiving connection with the prime mover to form therewith a power plant, the output power of which being consumed by the electrical power load, means responsive to predetermined power output of the power plant occasioned by the throttle advance effected by said automatic means, for interrupting further throttle advance, and means for reducing the power output of the power plant from said predetermined value and for removing said electrical power load including electrical means effective to cause retarding motion of the throttle control.

7. Apparatus for testing an engine comprising means for admitting fuel to the engine, electrical means for regulating the fuel-admitting means, an inductor generator adapted to be driven by the engine, time-responsive switches for causing the electrical means to adjust the fuel-admitting means from no-load to part load to full load and back to no load at certain times, means responsive to engine speed for connecting the inductor generator to a power line for loading the engine, means responsive to failure of the engine to operate at full load during the proper time therefor to set the electrical means against adjusting the fuel-admitting in order to prevent the testing of another engine, and key-controlled means for resetting the aforesaid means.

8. Apparatus for testing an engine comprising means for admitting fuel to the engine, electrical means for regulating the fuel-admitting means, an inductor generator adapted to be driven by the engine, time-responsive switches for causing the electrical means at certain times to increase the rate of the fuel-admitting means from no load and part load and to decrease the rate from full load to no load, means responsive to engine speed for connecting the inductor generator to a power line so as to load the engine, and switches responsive to current output by the inductor generator to the power line to cause the electrical means to fix the fuel-admitting means for part load of the engine and for full load of the engine.

9. Apparatus for testing a prime mover having regulatable means for admitting fuel to the prime mover, comprising means for regulating the fuel-admitting means, an inductor generator adapted to be driven by the prime mover at a frequency proportional thereto, a power line energized at a constant electrical frequency, means responsive to a predetermined rotative frequency of the prime mover for connecting the inductor generator to the power line whereby load can be applied to the prime mover, time-responsive elements for causing the regulating means at certain times to increase the rate of the fuel admitting means from no load and part load and to decrease the rate from full load to no load, and elements responsive to current output by the inductor generator to the power line to cause the regulating means to fix the fuel admitting means for part load of the prime mover and for full load of the prime mover.

10. Apparatus for testing an engine, comprising means for admitting fuel to the engine, electrical means for controlling the fuel-admitting means, an inductor generator adapted to be driven by the engine, means for connecting the inductor generator to a power line to load the engine, time-responsive switches connected with the electrical means for adjusting the fuel-admitting means for predetermined time periods at no load, part load, and full load, a speed-responsive switch connected with the means connecting the inductor generator and the power line for causing the power line and the inductor generator to be connected to one another above a predetermined engine speed, and means connecting the speed-responsive switch and one of the time-responsive switches for preventing connection of the inductor generator and the power line for a predetermined no-load period in spite of operation of the engine above the predetermined speed.

11. The apparatus specified in claim 10 and further comprising a switch openable in response to failure of the engine to pull full load during a full load time period for disabling the electrical means in its control of the fuel-admitting means so as to prevent the testing of another, means preventing closing of the last mentioned switch, and key-controlled means for releasing the last mentioned means to provide for return of the switch to closed position.

12. Apparatus for testing an engine comprising means for admitting fuel to the engine, electrical means for regulating the fuel-admitting means, and inductor generator adapted to be driven by the engine, time-responsive switches for causing the electrical means at certain times to increase the rate of the fuel-admitting means for no load and part load and to decrease the rate from full load to no load, means responsive to engine speed for connecting the inductor generator to a power line so as to load the engine, switches responsive to current output by the inductor generator to the power line to cause the electrical means to fix the fuel-admitting means for half load of the engine and for full load of the engine, means responsive to failure of the engine to operate at full load during the proper time therefor to set the electrical means against adjusting the fuel-admitting in order to prevent the testing of another engine, and key-controlled means for resetting the aforesaid means.

13. Apparatus for testing an engine having a fuel-supplying means, comprising hydraulic means for controlling the opening of the throttle valve including a cylinder and a piston slidably mounted therein and connected with the throttle valve, an electric device adapted by receiving current to cause the hydraulic means to increase the opening of the throttle valve and by failing to receive current to cause the hydraulic means to fix the opening of the throttle valve, means for supplying current to the electrical device comprising a source of electrical power and a circuit connecting the source of electrical power and the electrical device and including a first switch closable after a first predetermined time from a starting point to supply current to the electrical device for causing the latter to make the hydraulic means increase the opening of the throttle valve from idle position, a second switch openable upon the assumption of half load by the engine for interrupting flow of current to the electrical device to cause the hydraulic means to fix the opening of the throttle valve for half load on the engine, a third switch closable after a second predetermined time from the starting point greater than the first predetermined time and acting in parallel with the second switch now open to supply current to the electrical device for causing the hydraulic means to increase the opening of the throttle valve from the position for half load on the engine, a fourth switch openable upon the assumption of full load by the engine to interrupt the flow of current to the electrical device for causing the hydraulic means to fix the opening of the throttle valve for full load on the engine, a fifth switch closable after a third predetermined time from the starting point greater than the second predetermined time, and a sixth switch openable in response to closing of the fifth switch and failure of the fourth switch to open for interrupting flow of current to the electrical device and closable only by means of a key a seventh switch openable after a fourth predetermined time from the starting point greater than the third predetermined time for causing the hydraulic means to return the throttle valve to idle position, and means for operating the first, third, fifth, and seventh switches as aforesaid at the various times specified therefor after the starting point.

MATTHEW C. PATTERSON.
JOSEPH A. BAKER.

REFERENCES CITED

The following references are of record in the file of this patent:

UNITED STATES PATENTS

| Number | Name | Date |
|---|---|---|
| 1,508,353 | Scott | Sept. 9, 1924 |
| 1,635,980 | Highfield et al. | July 12, 1927 |
| 2,175,681 | Brunner | Oct. 10, 1939 |
| 2,362,682 | Watson | Nov. 14, 1944 |
| 2,394,131 | Wrathall et al | Feb. 5, 1946 |

Certificate of Correction

Patent No. 2,513,816 July 4, 1950

MATTHEW C. PATTERSON ET AL.

It is hereby certified that error appears in the printed specification of the above numbered patent requiring correction as follows:

Column 3, line 44, for "oened" read *opened*; column 8, line 52, after the word "period" strike out the comma; column 11, line 6, for "and" read *an*;

and that the said Letters Patent should be read as corrected above, so that the same may conform to the record of the case in the Patent Office.

Signed and sealed this 10th day of October, A. D. 1950.

[SEAL]

THOMAS F. MURPHY,
*Assistant Commissioner of Patents.*